April 28, 1959 R. V. C. DICKINSON ET AL 2,884,598

REACTANCE MODULATOR CIRCUIT AND METHOD

Filed April 1, 1955

Inventors
Eugene Gould
Robert V. C. Dickinson
By Schroeder, Hofgren, Brady & Wegner
Attorneys

United States Patent Office 2,884,598

Patented Apr. 28, 1959

2,884,598

REACTANCE MODULATOR CIRCUIT AND METHOD

Robert V. C. Dickinson, Winfield, and Eugene Gould, Skokie, Ill., assignors to The Hallicrafters Co., a corporation of Delaware Application April 1, 1955, Serial No. 498,496

2 Claims. (Cl. 332—28)

This invention is concerned with a modulator and more particularly with a novel circuit and method for reactance modulating a variable frequency oscillator.

In frequency modulated oscillator circuits where a reactance tube is connected to the oscillator to vary the frequency thereof in accordance with the desired modulation, it is necessary to provide the modulator tube with a bias signal which has a quadrature relation with the signal of the oscillator. In most cases this bias signal is obtained from the oscillator itself and coupled to the modulator through a phase shift circuit which is intended to provide the necessary 90° shift in phase. With simple phase shift circuits, however, a 90° shift in phase can be attained only at a single frequency and if the center frequency of the oscillator should shift slightly the bias applied to the modulator will not be of the proper phase. During modulation instantaneous oscillator frequency varies continually above and below the center frequency and the phase of the bias also varies continually, causing resistive loading of the oscillator. This results in nonlinear frequency modulation and sometimes causes serious amplitude modulation of the oscillator.

We have devised and disclose and claim herein a reactance modulator circuit which provides linear modulation without the need for complicated phase shift circuits and which substantially eliminates amplitude modulation of the oscillator.

One feature of the invention is the provision of a reactance modulated oscillator comprising a variable frequency oscillator, a source of modulation, a pair of modulators connected to the source of modulation and to the oscillator for varying the frequency thereof in accordance with the modulation, and a circuit for deriving from the oscillator a pair of signals 180° out of phase with each other and substantially in quadrature relation with the output of the oscillator and for applying one of the signals to each of the modulators. Another feature is that the last mentioned circuit includes a phase splitter.

A further feature is that a 90° phase shift circuit is coupled to the oscillator and provides a signal which is coupled to a phase splitter circuit which has one output in phase with the output of the phase shift circuit and another output 180° displaced therefrom.

Yet another feature is the method of modulating a variable frequency oscillator which comprises deriving a signal from the oscillator, shifting the signal substantially 90° in phase, deriving from the shifted signals a pair of signals 180° out of phase with each other and both substantially 90° out of phase with the signal from the oscillator, applying the pair of signals to a pair of modulators and applying a modulation signal to the modulators, the output of the modulators affecting the frequency of the oscillator.

Further features and advantages will readily be apparent from the following specification and from the drawings, in which.

Figures 1, 2, 3:
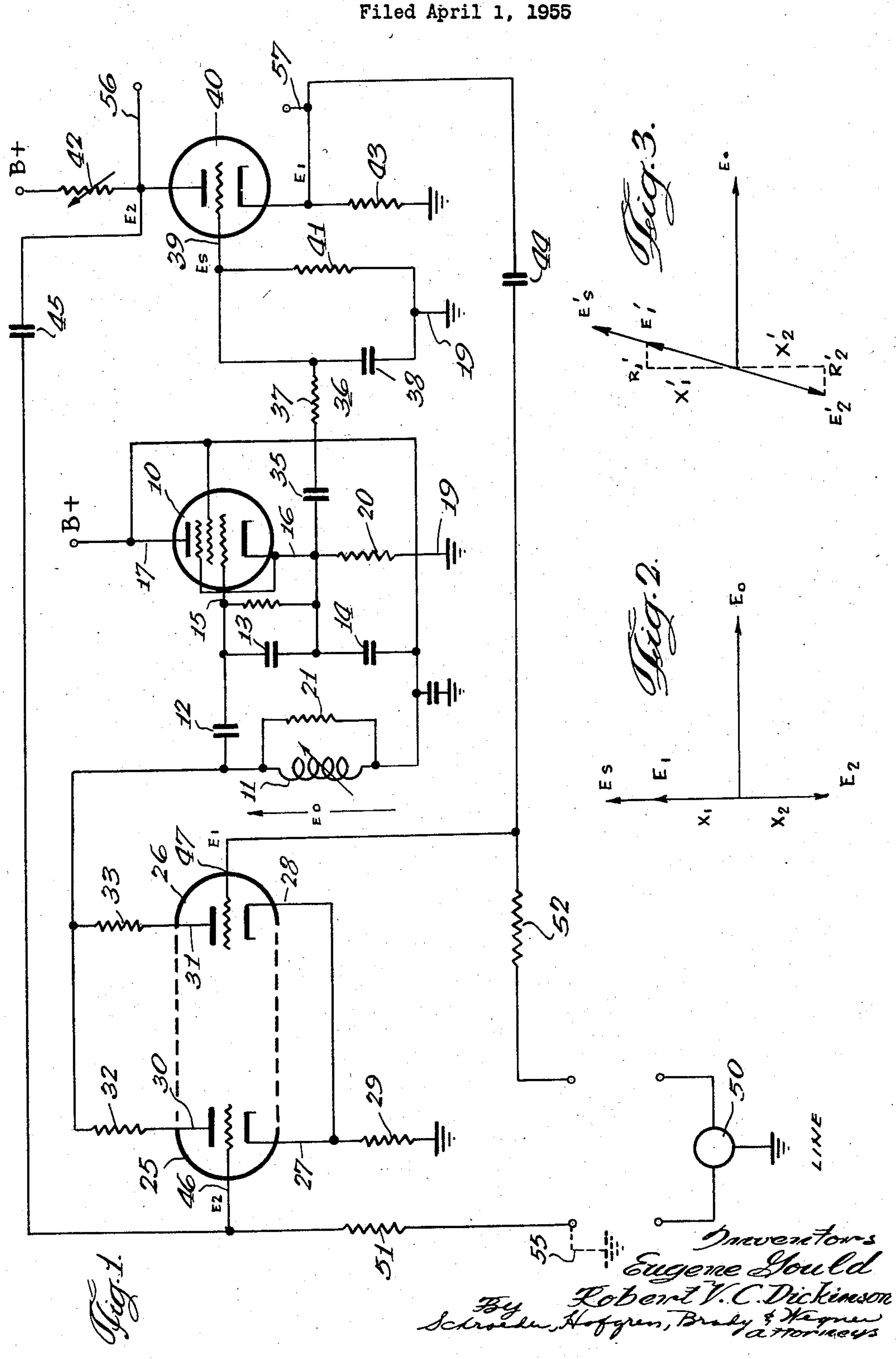
Figure 1 is a schematic diagram of a modulated oscillator circuit embodying the invention.
Figure 2 is a vector diagram representing one condition of the circuit.
Figure 3 is another vector diagram illustrating another condition of the circuit.

In the following description, component values will be given for an operative modulated oscillator circuit. It is to be understood that these values are intended only as illustrative and are not critical unless it is specifically stated to the contrary.

Referring now to Figure 1, a 6AH6 pentode, indicated as 10, is connected as an oscillator with a tuned circuit including an inductor 11, adjustable from 6 to 11.5 millihenries, and capacitors 12, 1350 $\mu\mu$f. (micromicrofarads), 13, .01 $\mu$f. and 14, .1 $\mu$f., connected between the grid 15, cathode 16 and plate 17. This tuned circuit is designed for operation at a center frequency of 45 kc., with a deviation of ±5 kc. Plate 17 of the oscillator is connected to a B+ supply of 150 volts. Cathode 16 is returned to ground 19 through resistor 20, 3300 ohms. A loading resistor 21, 180,000 ohms, shunts the tuned circuit to reduce the Q.

A pair of triode modulators 25 and 26, the two halves of a type 5751 dual triode, have their cathodes 27 and 28 connected together and grounded through a common unbypassed resistor 29, 1,200 ohms. The circuit of plates 30 and 31 of the modulators are each provided with 33 ohm dropping resistors 32 and 33, and a common plate circuit for the modulators is completed through inductance 11 of the oscillator tuned circuit to the B+ supply, so that the plate current of the modulators flows through inductance 11 and affects the frequency of the oscillator.

An output signal from the oscillator is developed across cathode resistor 20 and is coupled through a D.C. blocking capacitor 35, .01 $\mu$f., to a simple phase shift network 36, which includes resistor 37, 47,000 ohms, and capacitor 38, 220 $\mu\mu$f., connected in series to ground 19. The oscillator output signal is in phase with and proportional to the voltage $E_0$ appearing across the tuned circuit. The voltage $E_s$ appearing across capacitor 38, which leads the signal derived from the oscillator by substantially 90°, is coupled directly to the control grid 39 of a triode phase splitter 40, one-half of a 12AU7 dual triode. The grid 39 is grounded through resistor 41, 100,000 ohms. Phase splitter 40 is provided with equal plate and cathode load resistors 42 and 43, respectively, each being 4,700 ohms in the circuit shown.

Two signals, $E_1$ and $E_2$ are derived respectively from the cathode and the plate circuits of the phase splitter and are coupled through capacitors 44 and 45, each .01 $\mu$f., to the control grids 46 and 47 of reactance modulators 26 and 25. The signals $E_1$ and $E_2$ are exactly 180° out of phase with each other and are equal in amplitude, phase splitter plate resistor 43 being made variable to permit adjustment of the amplitude of signal $E_2$. In addition, the signals $E_1$ and $E_2$ are substantially in quadrature relation with the signal from oscillator 10.

A modulating signal, which may be from a push-pull source 50, is coupled to the grids 46 and 47 of the modulators through isolating resistors 51 and 52, 100,000 ohms each.

When no modulating signal is present, the plate currents of modulators 25 and 26 are equal in amplitude but exactly 180° out of phase with each other so that the net A.C. plate current of the modulators flowing through inductance 11 is zero and the oscillator operates at its center frequency of 45 kc. When a modulating signal is applied to the system there is an A.C. component in the modulator plate current which, assuming that $E_s$ is exactly 90° displaced from $E_0$, appears to the oscillator as a pure reactance, varying the frequency of the oscillator in accordance with the amplitude of the modulation.

This situation (with no modulation) is illustrated by the vector diagram of Figure 2, where $X_1$ and $X_2$ represent the apparent reactance due to the plate currents of modulators 26 and 25 respectively.

In practice, a 90° phase shift cannot be achieved with the simple phase shift circuit shown even at the center frequency of the oscillator and even if a more sophisticated phase shift network were used, would not be maintained throughout the range of oscillator frequencies occurring during modulation. However, notwithstanding the fact that signal $E_s$ may vary from its quadrature relation with oscillator signal $E_0$, the bias signals $E_1$ and $E_2$ applied to reactance modulators 26 and 25 are always exactly 180° out of phase with each other and equal in amplitude.

Reference to the vector diagram of Figure 3 shows that in this situation the reactive components $X_1'$ and $X_2'$ of the modulator current are still equal and opposite so that the frequency of the oscillator is not affected in the absence of modulation. In addition, the resistive components are $R_1'$ and $R_2'$ are also equal and opposite, cancelling each other, so that there is no residual resistive loading of the oscillator. While during modulation the resistive components $R_1'$ and $R_2'$ will vary in amplitude and thus will not completely cancel, the resulting parasitic amplitude modulation of the oscillator is not objectionable as the unbalance is small and there is no residual unbalance to which the unbalance occurring during modulation is added.

A single-ended modulating signal may be utilized with this circuit by grounding the grid of one of the oscillators, as indicated in broken lines at 55, and applying the signal to the grid of the other modulator. Due to the use of a common un-bypassed cathode resistor 29 for the reactance modulator tubes, the modulator tubes are driven in essentially push-pull relationship and effect modulation of the oscillator as previously described.

The frequency modulated output of the system may be obtained between either of terminals 56 and 57, connected respectively to the plate and cathode of phase splitter 40, and ground. This signal may then be utilized in a desired manner, as by amplifying and then broadcasting it.

While we have shown and described certain embodiments of our invention, it is to be understood that it is capable of many modifications. Changes therefore, in the construction and arrangement may be made without departing from the spirit and scope of the invention as disclosed in the appended claims.

We claim:

1. A reactance modulated oscillator circuit of the character described, comprising: a variable frequency oscillator; a source of modulation; a pair of modulators each having a cathode and a grid and having a common cathode circuit, said modulators being connected to said oscillator; a circuit including a 90° phase shift circuit and a phase splitter for deriving from said oscillator a pair of signals 180° out of phase with each other and substantially in quadrature relation with the output of said oscillator and for applying one of said signals to each of said modulators; and a circuit for applying the modulation to the grid of only one of said modulators.

2. A reactance modulated oscillator of the character described, comprising: a variable frequency oscillator; a source of modulation; a pair of modulators connected to said source of modulation and to said oscillator for varying the frequency thereof in accordance with the modulation; and a circuit including a phase shift network and a phase splitter circuit having a vacuum tube with plate and cathode circuits and a grid to which a signal from said oscillator is applied, a pair of signals 180° out of phase with each other, and substantially in quadrature relation with the output of said oscillator, being derived from said plate and cathode circuits, one of said signals being applied to each of said modulators.

References Cited in the file of this patent

UNITED STATES PATENTS

| | | |
|---|---|---|
| 2,226,459 | Bingley | Dec. 24, 1940 |
| 2,279,660 | Crosby | Apr. 14, 1942 |
| 2,349,811 | Crosby | May 30, 1944 |
| 2,351,463 | Usselman | June 13, 1944 |
| 2,422,422 | Korman | June 17, 1947 |
| 2,805,395 | Hofweegen | Sept. 3, 1957 |